United States Patent
Seelmann et al.

(10) Patent No.: US 7,568,682 B2
(45) Date of Patent: Aug. 4, 2009

(54) SPRING-SUPPORTED SUSPENSION FOR NOISE INSULATION ELEMENTS

(75) Inventors: Peter Seelmann, Vienna (AT); Martin Petschnig, Kottingbrunn (AT)

(73) Assignee: Roehm GmbH & Co. KG, Darmstadt (DE)

( * ) Notice: Subject to any disclaimer, the term of this patent is extended or adjusted under 35 U.S.C. 154(b) by 410 days.

(21) Appl. No.: 10/586,878

(22) PCT Filed: Jan. 22, 2005

(86) PCT No.: PCT/EP2005/000623

§ 371 (c)(1),
(2), (4) Date: Jul. 21, 2006

(87) PCT Pub. No.: WO2005/075744

PCT Pub. Date: Aug. 18, 2005

(65) Prior Publication Data

US 2008/0237438 A1    Oct. 2, 2008

(30) Foreign Application Priority Data

Feb. 9, 2004  (DE) ............... 10 2004 006 359

(51) Int. Cl.
*F16F 1/06* (2006.01)

(52) U.S. Cl. ..................... 267/179; 267/170

(58) Field of Classification Search ................. 267/170, 267/174–179

See application file for complete search history.

(56) References Cited

U.S. PATENT DOCUMENTS

| | | | | |
|---|---|---|---|---|
| 3,169,757 A * | 2/1965 | Roder et al. | ................. | 267/177 |
| 4,162,064 A * | 7/1979 | Bouton et al. | ................. | 267/177 |
| 4,712,778 A * | 12/1987 | Newman | ................. | 267/170 |
| 5,361,500 A * | 11/1994 | Naslund et al. | ................. | 30/381 |
| 5,447,295 A * | 9/1995 | Taomo | ................. | 267/153 |
| 6,375,171 B1 * | 4/2002 | Zimmermann et al. | ...... | 267/137 |
| 2006/0185268 A1 | 8/2006 | Wiebel et al. | | |

FOREIGN PATENT DOCUMENTS

| | | |
|---|---|---|
| DE | 24 14 415 | 10/1975 |
| DE | 85 24 319.1 | 11/1985 |
| DE | 199 11 508 | 11/2000 |
| EP | 0213521 | 3/1987 |
| EP | 0530512 | 3/1993 |
| EP | 0 908 563 | 4/1999 |

OTHER PUBLICATIONS

U.S. Appl. No. 10/586,878, filed Jul. 21, 2006, Seelmann, et al.

* cited by examiner

*Primary Examiner*—Christopher P Schwartz
(74) *Attorney, Agent, or Firm*—Oblon, Spivak, McClelland, Maier & Neustadt, P.C.

(57) ABSTRACT

The invention describes a point-type, spring-supported suspension means for noise protection sheets.

13 Claims, 1 Drawing Sheet

SPRING-SUPPORTED SUSPENSION FOR NOISE INSULATION ELEMENTS

INTRODUCTION

Figure 1:
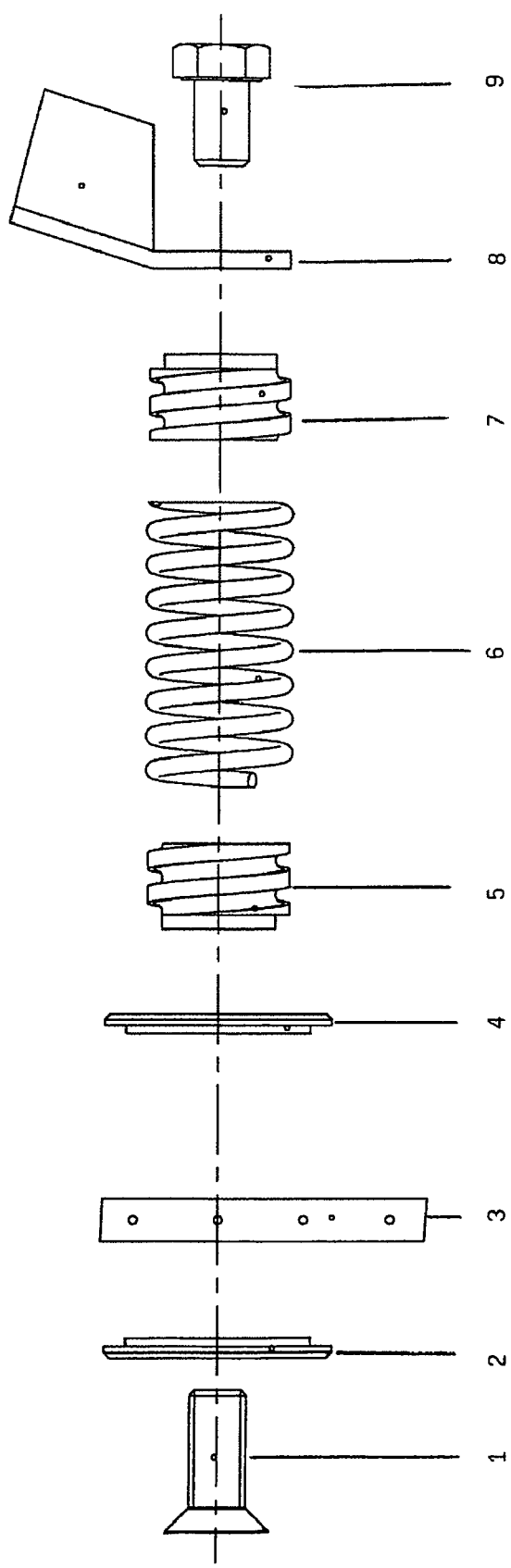

The invention relates to a suspension device for noise protection elements. The noise protection elements are secured on the supporting structure with the aid of the suspension device and, together with the supporting structure and, if appropriate, a base, form the noise barrier.

The noise protection element may consist, for example, of single-pane safety glass (SSG), of composite safety glass (CSG), of polymers, for example polyvinyl chloride (PVC) or recycled PVC, of composite materials, for example of laminates of aluminium and PVC.

The noise protection elements may be of sound-absorbing or sound-reflecting design. For this purpose, the noise protection elements may also be filled with sound-absorbing materials. The noise protection elements may be of transparent and translucent and non-transparent design. The transparent noise protection elements may consist, for example, of cast or extruded acrylic glass. The acrylic glass may also be coloured, provided with markings to prevent birds from flying into it or provided with reinforcing elements.

Furthermore, as material for the noise protection element, use may be made of all suitable transparent, opaque or non-transparent polymers, such as polycarbonate (PC) or polyethylene terephthalate (PET) in addition to polymethyl (meth) acrylate.

The noise protection elements of acrylic glass are sold by Röhm GmbH & Co. KG under the name PLEXIGLAS®-Soundstop.

Ever more frequently there is the demand for a frameless suspension means for transparent noise protection elements of sheets of acrylic glass. This suspension means, referred to below as a point-type suspension means, offers new design possibilities and at the same time fulfils a multiplicity of static, dynamic and functional tasks. Many of these tasks are not fulfilled by conventional point-type suspension means as are used, for example, in glass-securing means.

PRIOR ART

Currently, point-type securing means for sheet elements are available commercially and are constructed in each case from two joints. These may be rotary joints or ball-and-socket joints. The degrees of freedom of a joint are situated in each case in the loading direction of the adjacent joint. This gives rise to the situation of it being possible only for some of the joints to ever be able to absorb loads in a certain direction. An asymmetrical loading of the sheet elements and of the substructure is therefore obtained. The point-type suspension means have to be dimensioned in such a manner that they withstand this static and dynamic loading. This means that the components are disproportionately large. Since this is not acceptable in practice, the main weight has been dissipated via linear bearings.

Rigid securing means constitute an elegant and inexpensive means of securing sheet elements. However, they can be used only in very small applications and in small temperature fluctuations, i.e. in air-conditioned rooms. The greatest problem is the thermal expansion which, due to Hooke's law (Hooke's law $\sigma = E*\epsilon$), often causes impermissible stresses in the sheet element or in the substructure.

In the development of transparent noise barriers, a trend towards frameless suspension means can be seen. These architectural designs require virtually exclusively a point-type means of securing the noise protection elements.

Point-type securing means for noise protection elements are described, for example, in DE 0 908 563, a noise barrier segment (NB segment) having at least one polymer noise protection sheet (NP sheet) is provided with at least one means for securing the sheet on a support, characterized in that the sheet is mounted in a point-type articulated manner such that a bending line of the sheet that results under load can be accompanied by the securing means.

The securing means preferably has a bolt which can be anchored at one end on the support and reaches at its other end through a recess provided in the sheet and through at least one disc element arranged on both sides of the sheet outer surfaces in close contact therewith, there being arranged in the recess an elastic spring element, the height of which is greater than the thickness of the sheet to be secured, and the bolt being mounted spherically in the disc element.

DE-U 85 24 319.1 and EP-A-0 213 521 have disclosed glazing bars for the erection of noise barriers, which contain large panes of transparent polymer between upright posts, the said glazing bars corresponding approximately to the supports mentioned at the beginning. In these systems, instead of an I-support use may also be made of a rectangular tube which corresponds in respect of its dimensions to the I-support. The individual sheets are placed at a distance from one another onto one of the side surfaces of the rectangular tube and are clamped by means of a clamping rail and a corresponding number of screws against the rectangular tube through the gap between the individual sheets. The construction is sufficiently stable in wind, but requires relatively wide rectangular tubes for this.

A remedy for this is supplied, for example, by EP-A-0 530 512. This discloses a sheet system in which polymer sheets are not laid at a distance in an abutting relationship or in an overlapping manner essentially outside the bearing surface of the support, but rather, partially overlapping one another, are secured to the support by the overlap and the bearing surface on the support. This enables the required width of the support to be approximately halved without impairing the stability. Although this gives rise to a visually more attractive impression, in particular for wall systems and especially in the case of transparent noise barriers, since the supports are slender and no longer have an ungainly effect as hitherto, the technique known from EP-A-0 530 512 still requires relatively small post distances of approximately 2 meters and a guide for the sheets over the entire height of up to 3 meters.

OBJECT

It was the object of the invention to develop a further, frameless suspension means for noise protection elements of sheets of acrylic glass and other noise protection elements. A further object is to develop a securing device for noise protection elements of acrylic glass, which device makes it possible to introduce forces into the supporting structure from all directions via the securing device. Similarly, the securing means is to be able to absorb the thermal change in length.

Furthermore, the securing device is to be simple and inexpensive to produce and fit.

In order to avoid the occurrence of oscillating phenomena in the case of dynamic load changes (wind loads), the resonant frequency of the system comprising noise protection element, suspension or securing device and supporting structure is to lie above 0.5 Hz.

A main requirement is the absorption of the loads in all directions, in which case there should be uniform distribution to all load-absorbing points. This makes it necessary for the securing points to be highly flexible.

Furthermore, the intention is for only the securing points to be visually recognizable on the surface. Additional fixing systems, for example by means of steel cables, generally constitute an undesirable visual annoyance.

ACHIEVEMENT

The object according to the invention is achieved by a device according to Claim 1.

The device contains a spring-assisted suspension means for noise protection elements of acrylic glass, comprising, for example, a spiral spring (6) which is screwed on to a spring mount (FIG. 1, numbers 5, 7) which is provided with a thread.

The effect achieved by this is that the spiral spring (FIG. 1, reference number 6) is fixed non-displaceably and, in the event of the noise protection element being fractured by an external action, small parts having a high kinetic energy do not fly around in an uncontrolled manner. This effect furthermore has the consequence of rendering a separate fixing system in form of a visually annoying steel cable superfluous.

Further elements of the spring-supported suspension means for noise protection elements are the support (FIG. 1, No. 8) which is secured on the supporting structure. The support may also be referred to as locking bar and is arranged in the statically required number at the calculated distances on the supporting structure.

The first part of the spring mount (7) is secured on the suspension device (8) with the aid of the screw (9). The first part of the spring mount (7) can be secured on the suspension device by means of all customary securing techniques, for example by welding, riveting, screwing, clamping or bonding.

The spring mounts (7 and 5) comprise two pieces and are dimensioned in such a manner that approx. 3-5 turns of the spring (6) remain free. The free turns of the spiral spring ensure the elastic suspension of the noise protection elements.

The spring mounts (7, 5) have, on their outside, grooves in which the spring engages in a form-fitting and frictional manner.

The spring mounts (7, 5) are manufactured, for example, of steel, glass-fibre-reinforced polymer or polymer.

The spring (6) consists, for example, of a steel wire. Furthermore, the spring may be manufactured from polymer, for example polypropylene or polyethylene, or from rubber, wood, aluminium, stainless steel or mineral material, or from metal alloys for example, brass, bronze or cast iron.

The spring may also be designed as a torsion bar composed of the suitable materials mentioned above.

The stiffness of the spring in the longitudinal direction is, for example, approx 10 000 N/m-25 000 N/m. The stiffness of the spring in the transverse direction is, for example, 50 000 N/m-10 000 N/m. The spring elements may furthermore also be designed in such a manner that they do not have a linear characteristic in accordance with Hooke's law, but rather a progressive characteristic. In the case of spiral springs, this is achieved by conical winding or by variable pitches.

The suspension means according to the invention may also be used for securing façade elements and claddings composed of the abovementioned materials.

The position of the securing element in the room does not have any effect on the function: securing overhead is just as possible as securing on the floor or horizontal securing. Both straight and curved elements may be secured.

EXAMPLE 1

Destructive loading of the spring-supported suspension means of the noise protection elements of acrylic glass.

A sheet of acrylic glass of the type PLEXIGLAS®-Soundstop having the dimensions 2000×2000×15 mm (L×B×thickness) was subjected to the pendulum fracturing test according to EN 1794-2 (April 2003).

The entire element (noise protection elements and suspension means according to the invention) was investigated. The spring had a stiffness of 19 000 N/m.

The hole diameter in the noise protection element (securing hole) had a diameter of 65 mm. On the outside of the sheet, the securing hole was additionally also provided with a turned groove with a diameter of 80 mm and depth of 3 mm.

RESULT

None of the suspension points became detached from the sheet of acrylic glass. No fracture lines emerged from the holes of the suspension points in the sheet of acrylic glass.

The springs were plastically deformed without fractures or cracks occurring. The plastic deformation of the springs contributed considerably to dissipating the impact energy supplied.

The two-part spring mount (FIG. 1, numbers 5, 7) did not become detached from the spring in any situation.

EVALUATION

The suspension means according to the invention is suitable as a fixing system for the fractured sheet of acrylic glass.

FIG. 1

LIST OF REFERENCE NUMBERS

1 Screw according to DIN 7991
2 Clamping disc I
3 Noise protection element, PLEXIGLAS®-Soundstop
4 Clamping disc II
5 Spring mount I
6 Spring
7 Spring mount II
8 Suspension device
9 Screw according to DIN 933

The invention claimed is:

1. A spring-supported suspension means for noise protection elements, comprising:
   a spring;
   a first and second spring mount;
   wherein a first end of the first spring mount is secured on a suspension device and a first end of the spring is screwed onto a second end of the first spring mount, and
   wherein a first end of the second spring mount is secured in a hole of a noise protection element by means of a first and second clamping disc and a second end of the second spring mount is screwed into a second end of the spring to an extent to allow elastic suspension of the noise protection element, and
   a first side of the first clamping disc contacts the noise protection element, and
   a second side of the first clamping disc opposite the first side of the first clamping disc contacts the second spring mount, such that
   the first clamping disc is sandwiched between the noise protection element and the second spring mount.

2. The spring-supported suspension means according to claim 1, wherein the spring is a coil spring.

3. The spring-supported suspension means according to claim 2, wherein the second spring mount is screwed into the second end of the spring to an extent such that approximately 3 revolutions of the spring remain free.

4. The spring-supported suspension means according to claim 2, wherein the spring includes steel wire.

5. A noise barrier comprising a base of a supporting structure and suspension means, wherein noise protection elements are secured by means of the spring-supported suspension means according to claim 1.

6. The noise barrier according to claim 5, wherein a resonant frequency of a system, comprising the noise protection element, suspension device, and supporting structure, is greater than 0.5 Hz.

7. The spring-supported suspension means according to claim 1, wherein the noise protection element includes single-pane safety glass, composite safety glass, polymers, or composite materials.

8. The spring-supported suspension means according to claim 7, wherein the noise protection element includes acrylic glass.

9. The spring-supported suspension means according to claim 1, wherein the stiffness of the spring is between 15000 N/m and 25000 N/m.

10. The spring-supported suspension means according to claim 1, wherein the spring is a torsion bar.

11. The spring-supported suspension means according to claim 1, wherein the spring includes polymer, metal alloy, rubber, wood, aluminum, stainless steel, or mineral material.

12. The spring-supported suspension means according to claim 1, wherein the first and second spring mount include steel, glass-fiber-reinforced polymer, or polymer.

13. The spring-supported suspension means according to claim 1, wherein the first and second spring mount each have grooves on an outer surface configured to engage the spring in a form-fitting and frictional manner.

* * * * *